United States Patent
Murakami

(10) Patent No.: US 8,139,615 B2
(45) Date of Patent: Mar. 20, 2012

(54) DATA PROCESSING APPARATUS

(75) Inventor: Yoshihiro Murakami, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 924 days.

(21) Appl. No.: 12/106,085

(22) Filed: Apr. 18, 2008

(65) Prior Publication Data

US 2008/0298512 A1 Dec. 4, 2008

(30) Foreign Application Priority Data

May 31, 2007 (JP) ................. 2007-145720

(51) Int. Cl.
*H04J 3/04* (2006.01)
(52) U.S. Cl. .................. 370/536; 370/535; 370/542
(58) Field of Classification Search .............. 381/1, 2, 381/17–23; 370/535, 536, 542; 375/61, 375/69

See application file for complete search history.

(56) References Cited

U.S. PATENT DOCUMENTS

| 2001/0008535 A1* | 7/2001 | Lanigan | 370/487 |
| 2002/0067744 A1* | 6/2002 | Fujii et al. | 370/535 |
| 2004/0123177 A1* | 6/2004 | Ooishi | 713/503 |
| 2007/0109929 A1* | 5/2007 | Lo Muzio et al. | 369/44.34 |

FOREIGN PATENT DOCUMENTS

JP 07-219080 8/1995

* cited by examiner

*Primary Examiner* — Cuong Q Nguyen
*Assistant Examiner* — Yosef Gebreyesus
(74) *Attorney, Agent, or Firm* — Studebaker & Brackett PC; Donald R. Studebaker

(57) ABSTRACT

A data processing apparatus includes a channel demultiplexing circuit, a bus, a memory controller and a memory. The channel demultiplexing circuit has a first delay circuit which delays first channel data only of multi-channel data by one cycle and outputs first delayed channel data, a second delay circuit which delays second channel data only of the multi-channel data by one cycle and outputs second delayed channel data, and a channel data holding circuit which stores first coupled data obtained by coupling the first channel data and the first delayed channel data for multiple cycles and stores second coupled data obtained by coupling the second channel data and an output of the second delay circuit for multiple cycles. The channel demultiplexing circuit selectively outputs a first channel data group and a second channel data group to the bus.

19 Claims, 11 Drawing Sheets

DATA PROCESSING APPARATUS

BACKGROUND OF THE INVENTION

1. Field of the Invention

The present invention relates to a technology of demultiplexing a multi-channel signal such as a stereo audio signal into multiple channel signals.

2. Description of the Related Art

In a case where a stereo audio signal having an L-channel signal (or Left channel signal) and an R-channel signal (or Right channel signal) is recorded as an audio signal to be recorded on an optical disk such as a CD (Compact Disk), the L-channel signal and the R-channel signal may often be mixed in recording. In order to perform audio processing on the R-channel signal and the L-channel signal separately, processing (which will be called "channel demultiplexing processing" hereinafter) is required for demultiplexing or separating the stereo audio signal read out from an optical disk into an L-channel signal and an R-channel signal and storing the signals into a memory such as a RAM (Random Access Memory). The conventional technology relating to this type of channel demultiplexing processing is disclosed in Patent Document 1 (Japanese Patent Application Laid Open Kokai No. 07-219080).

FIG. 1 is a block diagram showing a schematic configuration of a conventional data processing apparatus 10 which performs the channel demultiplexing processing. The data processing apparatus 10 includes a semiconductor circuit 100, which is an integrated circuit, a ROM (Read Only Memory) 104, and a RAM (Random Access Memory) 105. The semiconductor circuit 100 has a processor 101 such as a CPU, a first memory controller 102 connected to the ROM 104, a second memory controller 103 connected to the RAM 105 and an internal bus 201. The processor 101 is a bus master that is responsible for the right to use the internal bus 201, and the first memory controller 102 and the second memory controller 103 are bus slaves. The ROM 104 records a program to be executed by the processor 101. The processor 101 can load and execute an instruction program for channel demultiplexing from the ROM 104 through the first memory controller 102. The RAM 105 stores stereo data read out from an optical disk.

FIG. 2 is a schematic diagram for illustrating a routine of the channel demultiplexing processing. As shown in FIG. 2, the stereo data recorded in the RAM 105 cyclically includes 32 bit data {Ri,Li} (where i is one of 0 to 1023) containing a pair of R-channel data Ri of the higher order 16 bits and the L-channel data Li of the lower order 16 bits. The processor 101 in FIG. 1 first loads and executes an instruction program for channel demultiplexing from the ROM 104 through the first memory controller 102. Next, the processor 101 transmits a read instruction to the second memory controller 103 according to the instruction program to cause the second memory controller 103 to sequentially read out the 32 bit data {Ri,Li} from the RAM 105 and transfer the read 32 bit data {Ri,Li} to the processor 101 through the internal bus 201. The processor 101 demultiplexes the transferred 32 bit data {Ri, Li} into R-channel data Ri and L-channel data Li. The processor 101 further transfers the R-channel data Ri and the L-channel data Li to the second memory controller 103 through the internal bus 201 and transmits a write instruction to the second memory controller 103. The second memory controller 103 stores the R-channel data Ri and the L-channel data Li transferred from the processor 101 into selected areas in the RAM 105 according to the write instruction. As a result, as shown in FIG. 2, the R-channel data group only containing R-channel data R0 to R1023 and the L-channel data group only containing L-channel data L0 to L1023 are stored in the RAM 105.

However, the processor 101 may not perform most of the other processing than the channel demultiplexing processing while performing the channel demultiplexing processing since the channel demultiplexing processing imposes a large processing load on the processor 101 and requires a longer processing time. In particular, large latencies occur when the processor 101 reads out stereo data from the RAM 105 through the second memory controller 103 and when data is written into the RAM 105, which may disadvantageously reduce the performance of the entire system including the semiconductor circuit 100.

SUMMARY OF THE INVENTION

In view of the fact, it is an object of the present invention to provide a data processing apparatus which can reduce the latencies occurring during a channel demultiplexing processing and can perform the channel demultiplexing processing efficiently.

According to a first aspect of the invention, in order to achieve the object, there is provided a data processing apparatus which performs demultiplexing of multi-channel data into a first channel data group and a second channel data group and outputs them into a bus, the apparatus including a channel demultiplexing circuit, a memory which stores multi-channel data containing a pair of first channel data and second channel data for each predetermined cycle, and a memory controller which sequentially reads out the multi-channel data from the memory for the predetermined cycle and transfers the read multi-channel data to the channel demultiplexing circuit through the bus, wherein the channel demultiplexing circuit has a first delay circuit which delays the first channel data only of the multi-channel data transferred from the memory controller for the predetermined cycle and outputs the first delayed channel data, a second delay circuit which delays the second channel data only of the multi-channel data transferred from the memory controller by the predetermined cycle and outputs the second delayed channel data, a channel data holding circuit which stores first coupled data obtained by coupling the first channel data and the first delayed channel data for the multiple predetermined cycles and stores second coupled data obtained by coupling the second channel data and output of the second delayed circuit for the multiple predetermined cycles, and a selective output circuit which selectively reads out the first channel data group and the second channel data group from the channel data holding circuit and outputs them to the bus.

According to a second aspect of the invention, there is provided a data processing apparatus which performs a demultiplexing of multi-channel data into a first channel data group and a second channel data group and outputs them into a bus, the apparatus including a channel demultiplexing circuit, a memory which stores multi-channel data containing a pair of first channel data and second channel data for each predetermined cycle, and a memory controller which sequentially reads out the multi-channel data from the memory at the predetermined cycles and transfers the read multi-channel data to the channel demultiplexing circuit through the bus, wherein the channel demultiplexing circuit has a first delay circuit which delays the multi-channel data transferred from the memory controller by the predetermined cycle and outputs first delayed multi-channel data, a second delay circuit which delays the first delayed multi-channel data by the predetermined cycle and outputs second delayed multi-channel data, and selective output circuit which alternately selects first channel data group obtained by coupling first channel data of the multi-channel data and first channel data of the first delayed multi-channel data and second channel data group obtained by coupling second channel data of the first delayed multi-channel data and second channel data of the second delayed multi-channel data and outputs them to the bus.

In the channel demultiplexing circuit of the data processing apparatus according to the first aspect of the invention, the first delay circuit delays first channel data only of the multi-channel data transferred from the memory controller by one cycle to create the first delayed channel data, and, in parallel with that, the second delay circuit delays second channel data only of the multi-channel data transferred from the memory controller by one cycle to create the second delayed channel data. The channel data holding circuit stores first coupled data obtained by coupling the first channel data and the first delayed channel data for multiple cycles, and, in parallel with that, stores second coupled data obtained by coupling the second channel data and the output of the second delay circuit for multiple cycles. The selective output circuit selectively reads out first channel data group and second channel data group from the channel data holding circuit and outputs them to the bus. The channel demultiplexing circuit allows the improvement of the processing ability of the entire system since the latency occurring during channel demultiplexing processing can be reduced more than conventional channel demultiplexing circuit.

In the channel demultiplexing circuit of the data processing apparatus according to the second aspect of the invention, the first delay circuit delays multi-channel data transferred from the memory controller by one cycle to create the first delayed channel data, and the second delay circuit delays the first delayed channel data by one cycle to create the second delayed multi-channel data. A first channel data group is created by coupling first channel data of multi-channel data and first channel data of the first delayed multi-channel data, and a second channel data group is created by coupling second channel data of the first delayed multi-channel data and second channel data of the second delayed multi-channel data. The selective output circuit alternately selects the first channel data group and the second channel data group and outputs them to the bus. The channel demultiplexing circuit also allows the improvement of the processing ability of the entire system since the latency occurring during channel demultiplexing processing can be reduced more than conventional channel demultiplexing circuit.

DETAILED DESCRIPTION OF THE INVENTION

Various embodiments according to the invention will be described below.

Figure 3:
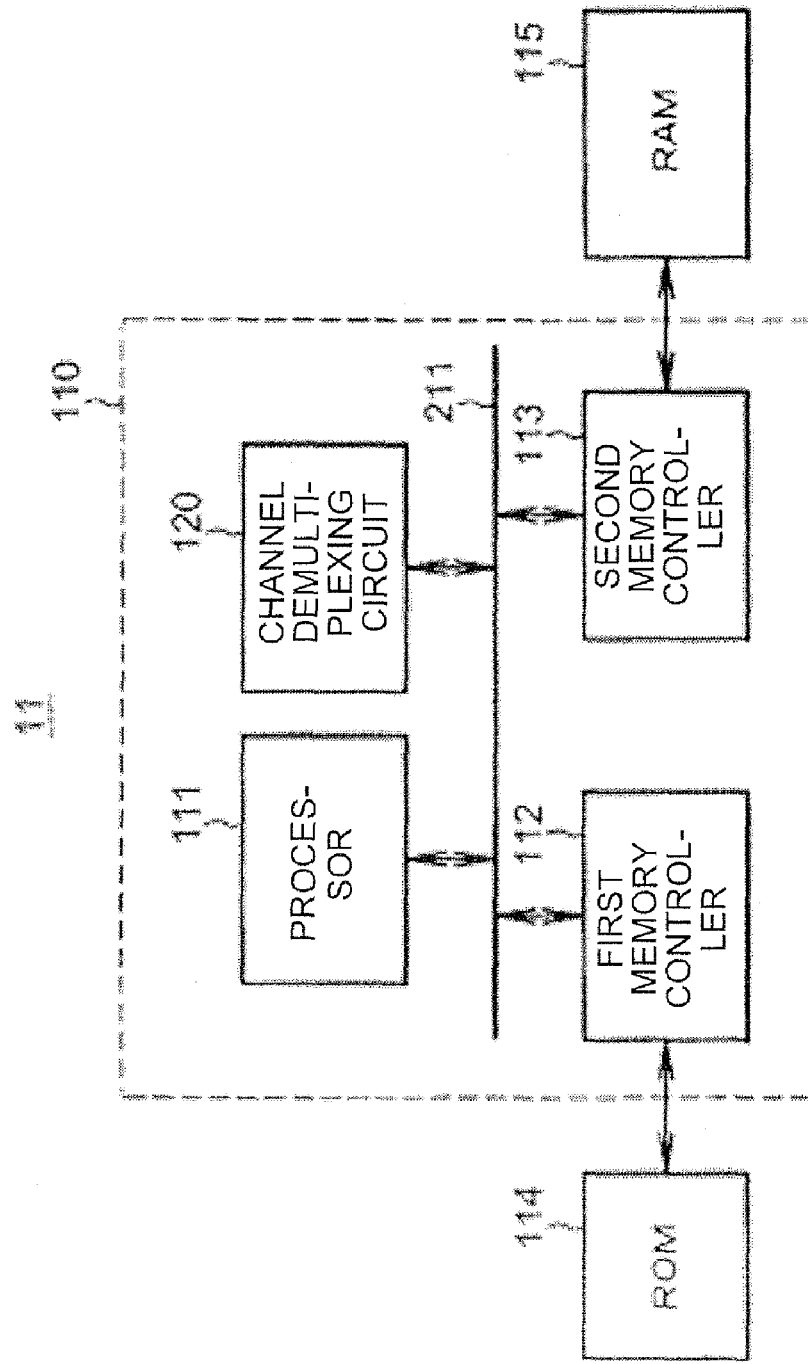
FIG. 3 is a block diagram showing a schematic configuration of a data processing apparatus according to an embodiment of the invention.

FIG. 3 is a block diagram showing a schematic configuration of a data processing apparatus 11 according to an embodiment of the invention. The data processing apparatus 11 includes a semiconductor circuit 110, which is an integrated circuit, a ROM (Read Only Memory) 114 and a RAM (Random Access Memory) 115. The semiconductor circuit 110 has a processor 111 such as a CPU, a channel demultiplexing circuit 120, a first memory controller 112 connected to the ROM 114, a second memory controller 113 connected to the RAM 115, and an internal bus 211. The processor 111 is a bus master that is responsible for the right to use the internal bus 211. The channel demultiplexing circuit 120 has both functions as a bus master and a bus slave. When the processor 111 is a bus master, the channel demultiplexing circuit 120 operates as a bus slave. The first memory controller 112 and the second memory controller 113 are always bus slaves. The ROM 114 records a program to be executed by the processor 111, and the processor 111 can load and execute an instruction program for channel demultiplexing through the first memory controller 112 from the ROM 114. The RAM 115 stores stereo data read out from an optical disk.

Figure 4:
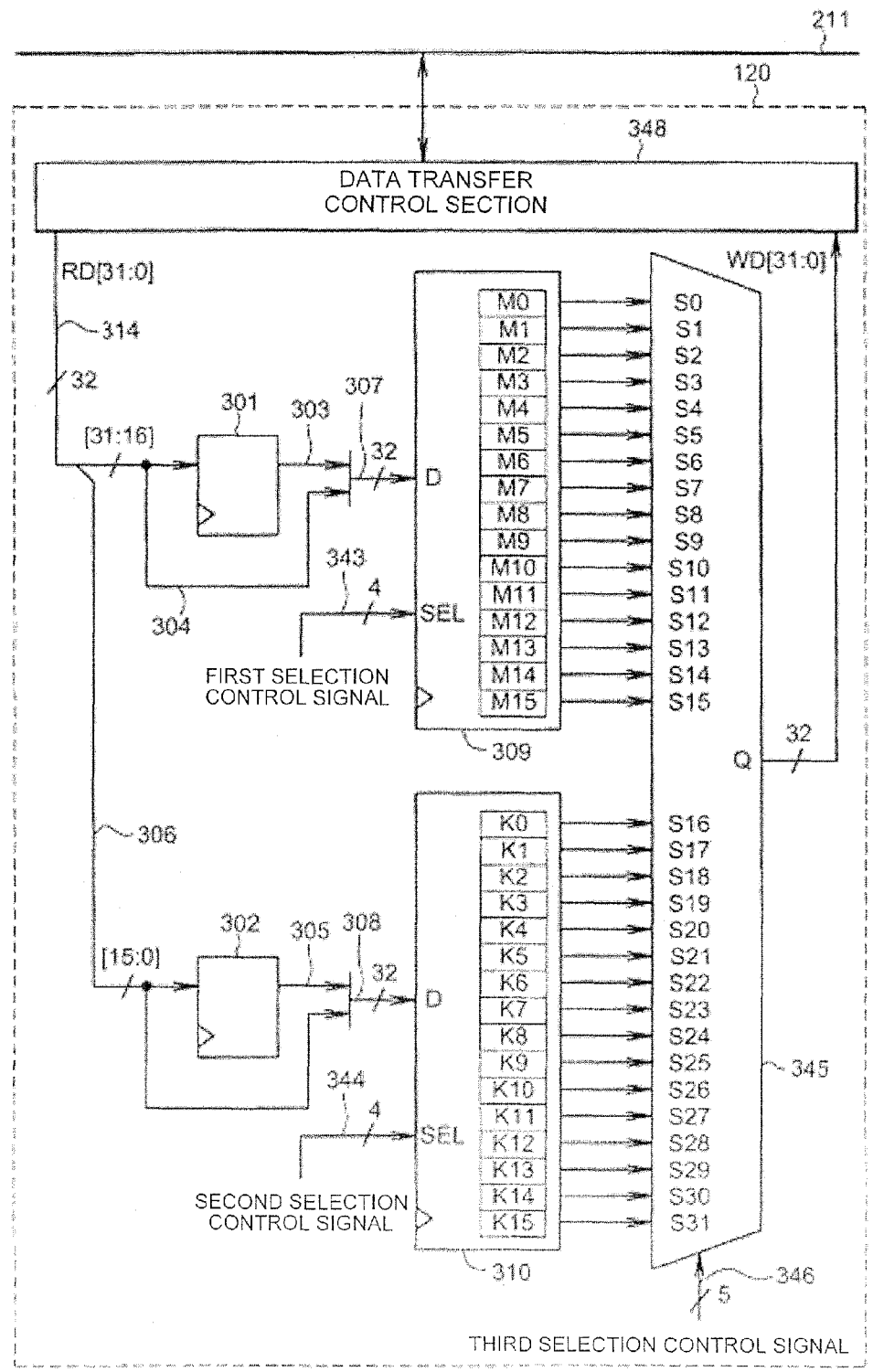
FIG. 4 is a diagram showing a schematic configuration of a channel demultiplexing circuit according to a first embodiment of the invention.

FIG. 4 is a diagram showing a schematic configuration of the channel demultiplexing circuit 120 according to a first embodiment of the invention. The channel demultiplexing circuit 120 in FIG. 4 has a data transfer control section 348 connected to the internal bus 211. The data transfer control section 348 is desirably a DMA controller having a burst transfer function. The data transfer control section 348 receives stereo data (multi-channel data) 300 containing 32 bit RD [31:1] transferred from the RAM 115.

Figure 1:
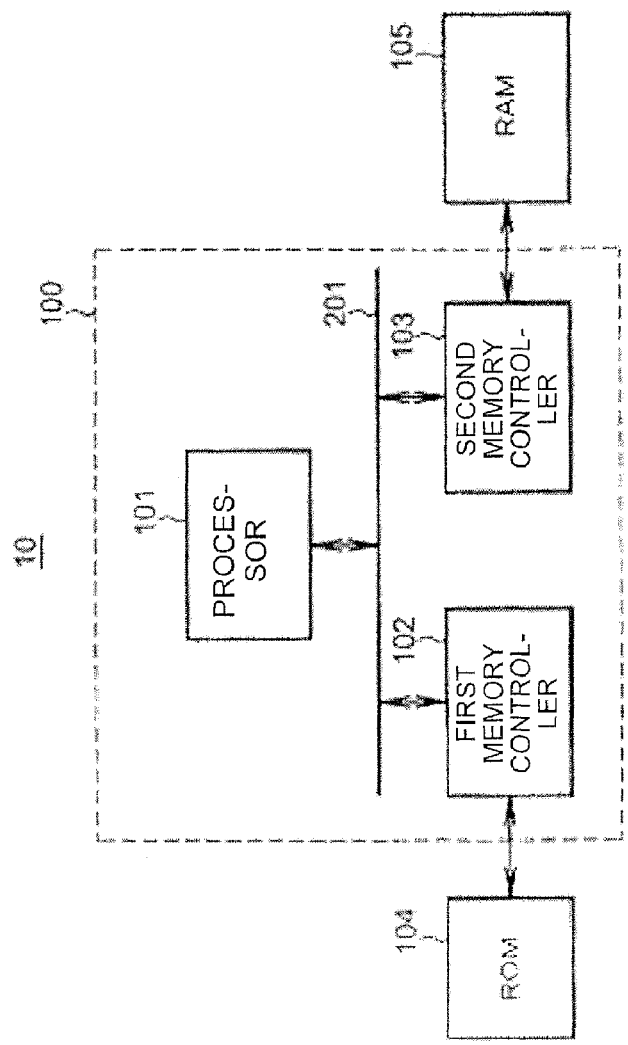
FIG. 1 is a block diagram showing a schematic configuration of a conventional data processing apparatus which executes channel demultiplexing processing.
Figure 2:
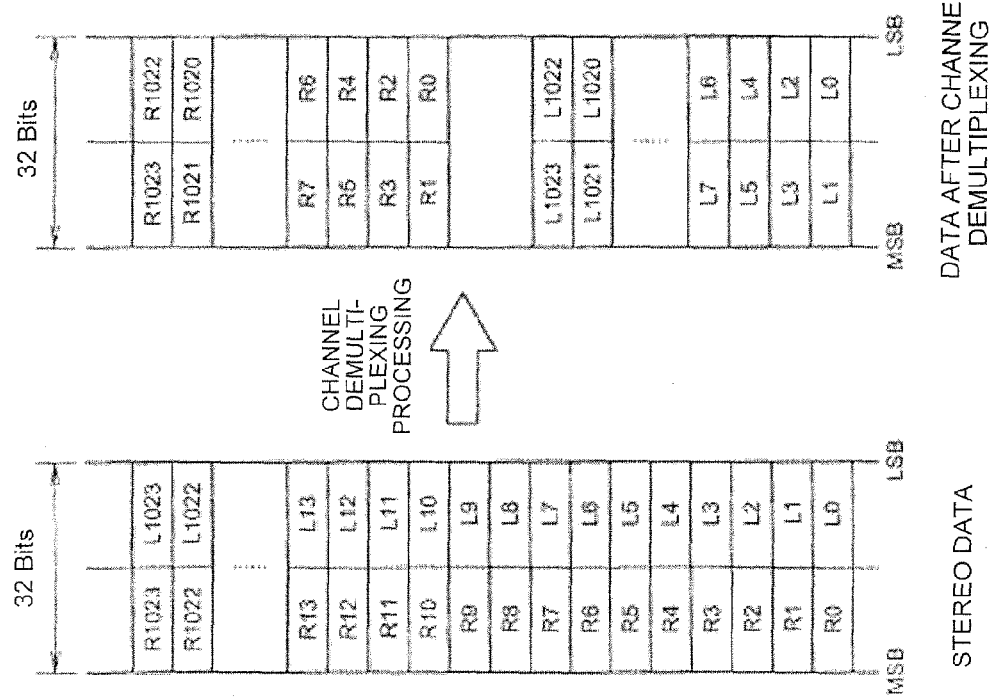
FIG. 2 is a schematic diagram for illustrating a routine of channel demultiplexing processing.

The first delay circuit 301 latches R-channel data 304 of the higher order 16 bits RD [31:16] of the stereo data 300, and the second delay circuit 302 latches L-channel data 306 of the lower order 16 bits RD [15:0] of the stereo data 300. The first delay circuit 301 and the second delay circuit 302 both operate in synchronization with an operational clock CLK supplied from a clock generator (not shown) and delay input signals by a time corresponding to a predetermined number of cycles of the operational clocks CLK. According to this embodiment, the stereo data 300 has a format as shown in FIG. 2. Based on the format, the stereo data 300 has cyclic arrays of a pair of R-channel data (first channel data) Ri of the higher order 16 bits and L-channel data (second channel data) Li of the lower order 16 bits. Each of the first delay circuit 301 and the second delay circuit 302 has a function of delaying input data by a predetermined cycle corresponding to the bit length (=32 bits) of the channel data pair {Ri,Li}.

First coupled data 307 of 32 bits contains a couple of delayed R-channel data 303 of 16 bits output from the first delay circuit 301 and R-channel data 304 of 16 bits branched from the stereo data 300. An R-channel data holding circuit 309 has a function of storing the first coupled data 307 for 16 cycles, which is input to a terminal D, in storage areas M0 to M15 having a capacity of 32×16 bits in total. More specifically, a first selection control signal 343 of four bits is supplied from the processor 111 to a terminal SEL of the R-channel data holding circuit 309. The R-channel data holding circuit 309 stores input data 307 into the storage area Mi (where i is one of 0 to 15) selected by the value of the first selection control signal 343 among the storage area M0 to M15. For example, if the value of the first selection control signal 343 is "0", input data 307 is stored in the storage area M0 corresponding thereto. If the value of the first selection control signal 343 is "1", input data 307 is stored in the storage area M1 corresponding thereto. The R-channel data R0 to R15 held in the storage areas M0 to M15 are output to the terminals S0 to S15 of a selective output circuit 345 in parallel.

On the other hand, second coupled data 308 of 32 bits contains a couple of delayed L-channel data 305 of 16 bits output from the second delay circuit 302 and L-channel data 306 of 16 bits branched from the stereo data 300. An L-channel data holding circuit 310 has a function of storing the second coupled data 308 for 16 cycles, which is input to the terminal D, in storage areas K0 to K15 having a capacity of 32×16 bits in total. More specifically, a second selection control signal 344 of four bits is supplied from the processor 111 to a terminal SEL of the L-channel data holding circuit 310. The L-channel data holding circuit 310 stores input data 308 into the storage area Ki (where i is one of 0 to 15) selected by the value of the second selection control signal 344 among the storage area K0 to K15. For example, if the value of the second selection control signal 344 is "0", input data 308 is stored in the storage area K0 corresponding thereto. If the value of the second selection control signal 344 is "1", input data 308 is stored in the storage area K1 corresponding thereto. The L-channel data L0 to L15 held in the storage areas K0 to K15 are output to the terminals S16 to S31 of the selective output circuit 345 in parallel.

The selective output circuit 345 selects input data to a terminal Sj (where j is one of 0 to 31) selected by the value of a third selection control signal 346 of five bits from the processor 111 and supplies the selected input data to the data transfer control section 348 as write data 347 of 32 bits WD [31:0]. For example, if the value of the third selection control signal 346 is "0", input data to the terminal S0 corresponding thereto is selected. If the value of the third selection control signal 346 is "1", input data to the terminal Si corresponding thereto is selected. The data transfer control section 348 performs burst-transfer of the write data 347 to the second memory controller 113 (FIG. 3) through the internal bus 211. The second memory controller 113 stores both of the R-channel data group and L-channel data group transferred from the channel demultiplexing circuit 120 into different storage areas from each other of the RAM 115.

Figure 5:
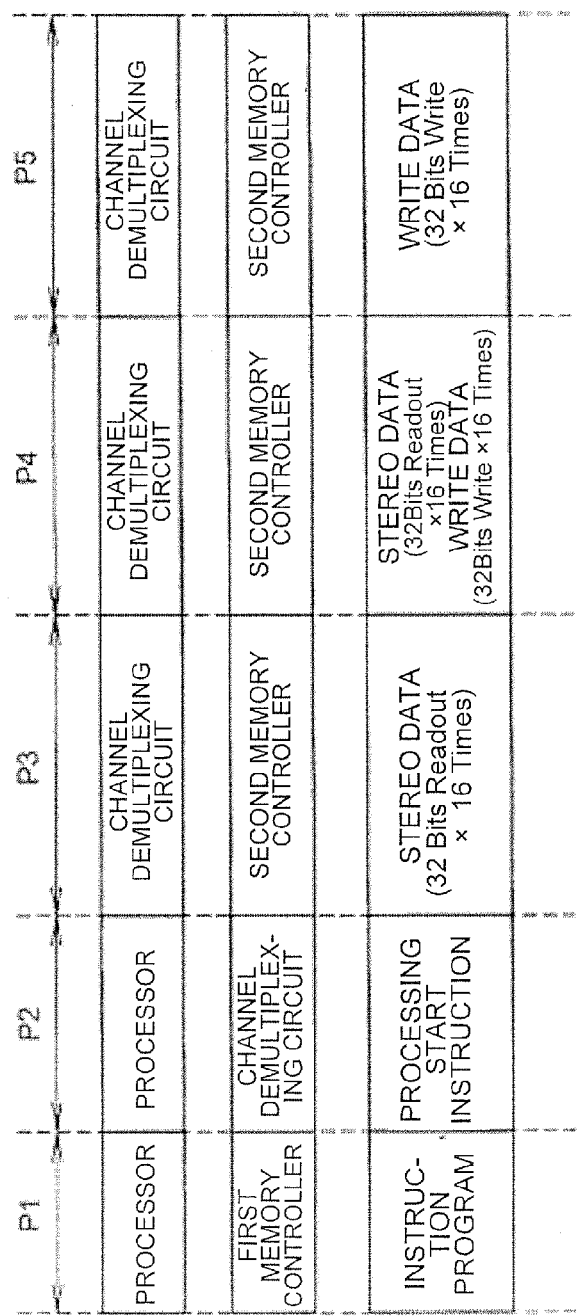
FIGS. 5A to 5C are timing charts schematically showing operational states of the channel demultiplexing circuit.
Figure 6:
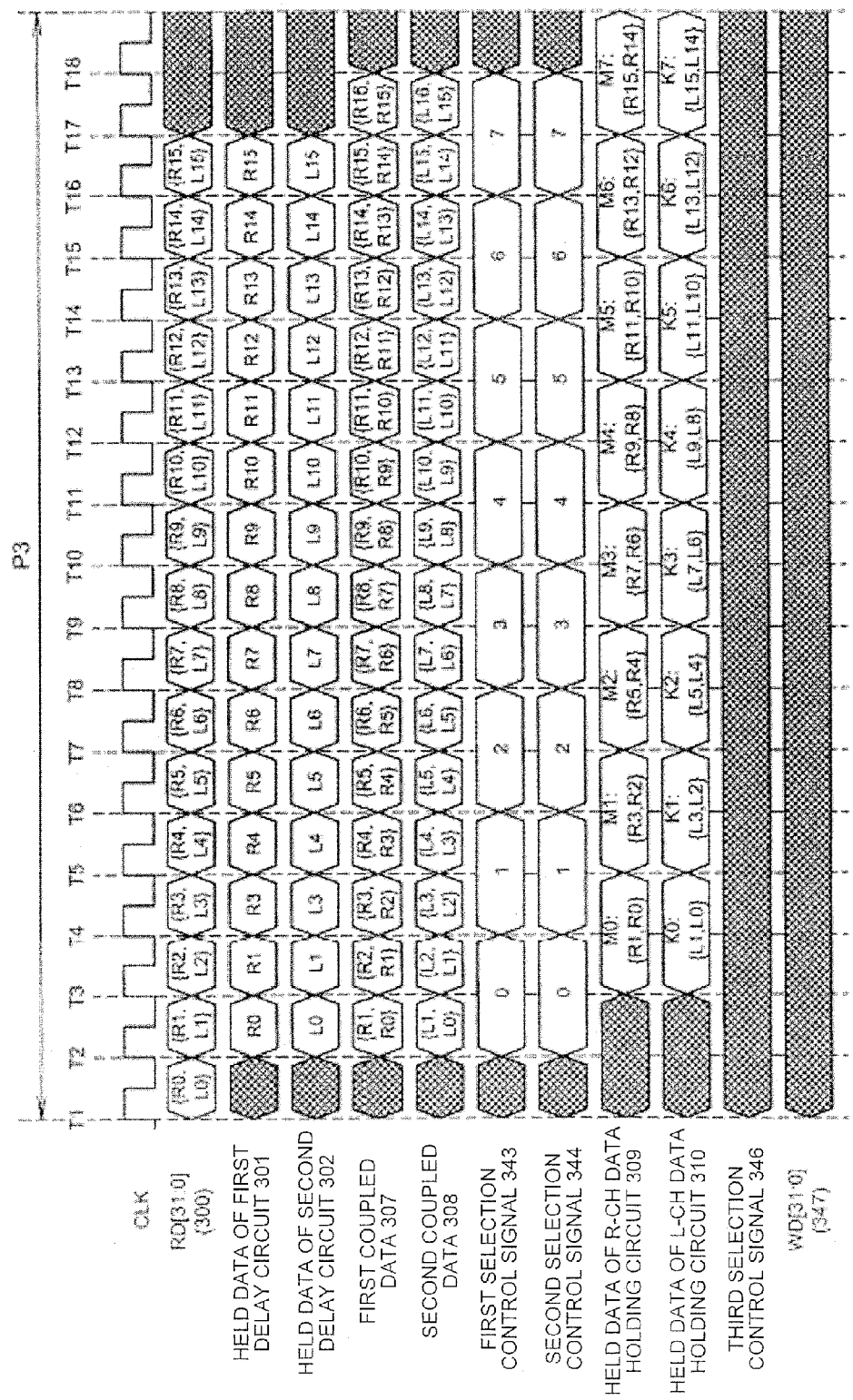
FIG. 6 is a timing chart showing states of data signals and control signals within the channel demultiplexing circuit.
Figure 7:
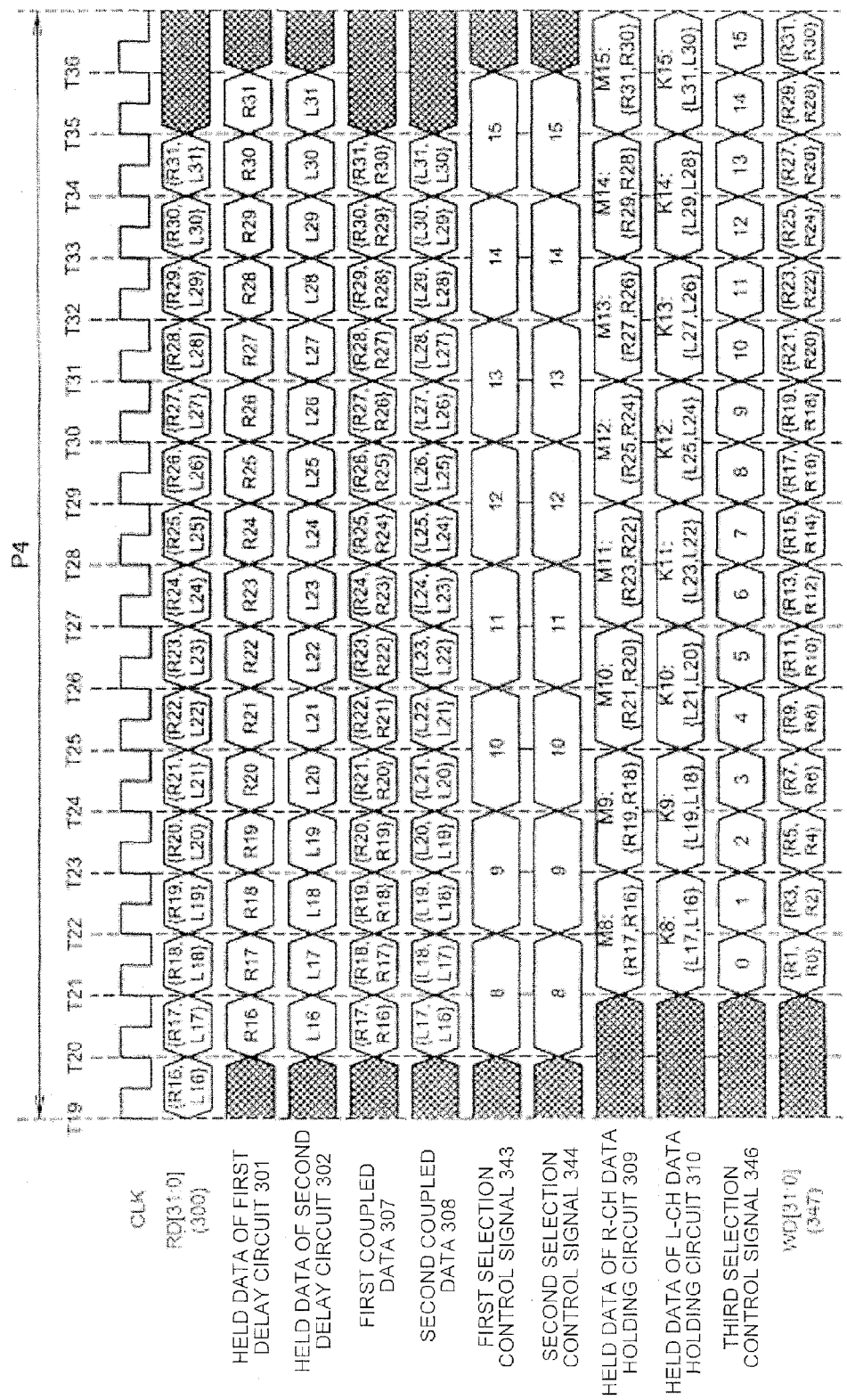
FIG. 7 is a timing chart showing states of data signals and control signals within the channel demultiplexing circuit.
Figure 8:
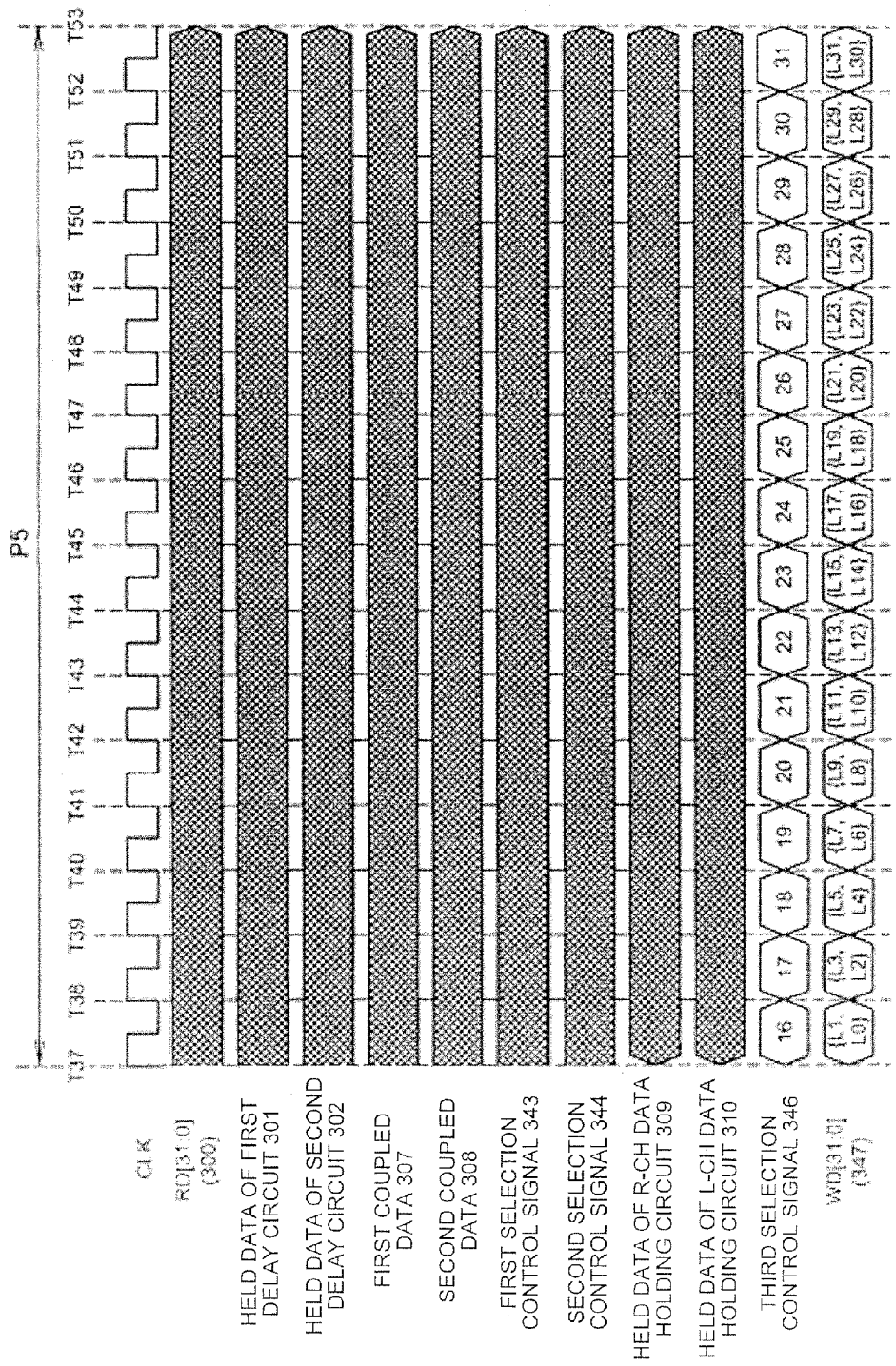
FIG. 8 is a timing chart showing states of data signals and control signals within the channel demultiplexing circuit.

With reference to FIGS. 5A to 8, operations by the channel demultiplexing circuit 120 according to the first embodiment will be described in detail below. FIGS. 5A to 5C are timing charts schematically showing operational states of the channel demultiplexing circuit 120. FIGS. 6 to 8 are timing charts illustrating the states of data signals and control signals within the channel demultiplexing circuit 120. FIG. 6 illustrates a signal state in a period P3, FIG. 7 illustrates a signal state in a period P4 and FIG. 8 illustrates a signal state in a period P5.

As shown in FIGS. 5A and 5B, in the first period P1, the processor 111 in FIG. 3 operates as the bus master, and the first memory controller 112 operates as the bus slave. In this case, as shown in FIG. 5C, the processor 111 transmits a read instruction for a channel demultiplexing program to the first memory controller 112. The first memory controller 112 according to the read program reads the program from the ROM 114 outside of the semiconductor circuit 110 and transfers the program to the channel demultiplexing circuit 120 through the internal bus 211. In the subsequent period P2, the processor 111 operates as the bus master and instructs to start channel demultiplexing processing to the channel demultiplexing circuit 120, which is the bus slave, according to the program loaded from the ROM 114.

In the next period P3, the channel demultiplexing circuit 120 operates as the bus master according to the instruction from the processor 111 and transmits a read instruction for stereo data 300 to the second memory controller 113, which is the bus slave. The second memory controller 113 sequentially reads the stereo data 300 in cycles according to the read instruction and performs burst-transfer of the read stereo data 300 to the channel demultiplexing circuit 120 through the internal bus 211. In this case, the stereo data 300 is read out 16 times in units of 32 bits from the RAM 115 and is burst-transferred to the channel demultiplexing circuit 120 as data in a burst length of 16. The channel demultiplexing circuit 120 performs channel demultiplexing processing on the stereo data 300 received from the second memory controller 113.

In the period P3, the pairs of channel data {R0,L0}, {R1,L1}, . . . and {R15,L15} are sequentially transferred to the data transfer control section 348 (FIG. 4) of the channel demultiplexing circuit 120. The data transfer control section 348 as shown in FIG. 6 supplies the pairs of channel data {R0,L0}, {R1,L1}, . . . and {R15,L15} to the first delay circuit 301 and second delay circuit 302 as stereo data 300 during times T1 to T17. The first delay circuit 301 holds sequences R0, R1, . . . and R15 of higher 16 bits data 304 branched from the stereo data 300, delays the data sequences R0, R1, . . . and R15 by one cycle and then outputs them as sequences of the delayed R-channel data 303. The sequences {R1,R0}, {R2,R1}, . . . and {R16,R15} of the first coupled data 307 are sequentially input to the terminal D of the R-channel data holding circuit 309. The R-channel data holding circuit 309 holds the sequences {R1,R0}, {R2,R1}, . . . and {R16,R15} of the first coupled data 307 every other sequence. More specifically, as shown in FIG. 6, the pair {R1,R0} of the first coupled data 307 is held in the storage area M0 based on the value "0" of the first selection control signal 343, the pair {R3,R2} of the first coupled data 307 is held in the storage area M1 based on the value "1" of the first selection control signal 343, the pair {R13,R12} of the first coupled data 307 is held in the storage area M6 based on the value "6" of the first selection control signal 343, and the pair {R15,R14} of the first coupled data 307 is held in the storage area M7 based on the value "7" of the first selection control signal 343.

On the other hand, the second delay circuit 302 holds sequences L0, L1, . . . and L15 of 16 bits data 306 of the lower 16 bits branched from the stereo data 300, delays the data sequences L0, L1, . . . and L15 by one cycle and then outputs them as sequences of the delayed L-channel data 305. The sequences {L1,L0}, {L2,L1}, . . . and {L16,L15} of the second coupled data 308 are sequentially input to the terminal D of the L-channel data holding circuit 310. The L-channel data holding circuit 310 holds the pairs {L1,L0}, {L2,L1}, . . . and {L16,L15} of the second coupled data 308 every other pair. More specifically, as shown in FIG. 6, the pair {L1,L0} of the second coupled data 308 is held in the storage area K0 based on the value "0" of the second selection control signal 344, the pair {L3,L2} of the second coupled data 308 is held in the storage area K1 based on the value "1" of the second selection control signal 344, the pair {L13,L12} of the second coupled data 308 is held in the storage area K6 based on the value "6" of the second selection control signal 344, and the pair {L15,L14} of the second coupled data 308 is held in the storage area K7 based on the value "7" of the second selection control signal 344.

In the next period P4, as shown in FIGS. 5A and 5B, the channel demultiplexing circuit 120 operates as the bus master, and the second memory controller 113 operates as the bus slave. The channel demultiplexing circuit 120 transmits a read instruction for stereo data 300 and a write instruction for storing the channel-demultiplexed write data in the RAM 115 to the second memory controller 113. The second memory controller 113 sequentially reads out the stereo data 300 in cycles according to the read instruction and burst-transfers the read stereo data 300 to the channel demultiplexing circuit 120 through the internal bus 211. In this case, the stereo data 300 is read out 16 times in units of 32 bits from the RAM 115 and is burst-transferred to the channel demultiplexing circuit 120 as data in a burst length of 16. On the other hand, the second memory controller 113 stores the write data burst-transferred from the channel demultiplexing circuit 120 into the RAM 115 according to the write instruction.

In the period P4, the selective output circuit 345 of the channel demultiplexing circuit 120, as shown in FIG. 7, sequentially selects the input data signals to the terminals S0 to S15 based on the values "0" to "15" of the third selection control signals 346 and outputs the selected data signals to the data transfer control section 348 as write data 347. The data transfer control section 348 burst-transfers the write data 347 as data in a burst length of 16 to the second memory controller 113.

In parallel with that, the pairs of channel data {R16,L16}, {R17,L17}, . . . and {R31,L31} are sequentially transferred to the data transfer control section 348 (FIG. 4) of the channel demultiplexing circuit 120. As shown in FIG. 7, the data transfer control section 348 supplies the pairs of channel data {R16,L16}, {R17,L17}, . . . and {R31,L31} to the first delay circuit 301 and the second delay circuit 302 as the stereo data 300 during times T19 to T35. The first delay circuit 301 holds the sequences R16, R17, . . . and R31 of the higher 16 bit data 304 branched from the stereo data 300, delays the data sequences R16, R17, . . . and R31 by one cycle and then outputs them as sequences of the delayed R-channel data 303. The sequences {R17,R16}, {R18,R17}, . . . and {R31,R30} of the first coupled data 307 are sequentially input to the terminal D of the R-channel data holding circuit 309. The R-channel data holding circuit 309 holds the pairs {R17, R16}, {R18,R17}, . . . and {R31,R30} of the first coupled data 307 every other pair. More specifically, as shown in FIG. 7, the pair {R17,R16} of the first coupled data 307 is held in the storage area M8 based on the value "8" of the first selection control signal 343, the pair {R19,R18} of the first coupled data 307 is held in the storage area M9 based on the value "9" of the first selection control signal 343, the pair {R29,R28} of the first coupled data 307 is held in the storage area M14 based on the value "14" of the first selection control signal 343, and the pair {R31,R30} of the first coupled data 307 is held in the storage area M15 based on the value "15" of the first selection control signal 343.

On the other hand, the second delay circuit 302 holds sequences L16, L17, . . . and L31 of the lower 16 bit data 306 branched from the stereo data 300, delays the data sequences L16, L17, . . . and L31 by one cycle and then outputs them as sequences of the delayed L-channel data 305. The sequences {L17,L16}, {L18,L17}, . . . and {L31,L30} of the second coupled data 308 are sequentially input to the terminal D of the L-channel data holding circuit 310. The L-channel data holding circuit 310 holds the pairs {L17,L16}, {L18,L17}, . . . and {L31,L30} of the second coupled data 308 every other pair. More specifically, as shown in FIG. 7, the pair {L17,L16} of the second coupled data 308 is held in the storage area K8 based on the value "8" of the second selection control signal 344, the pair {L19,L18} of the second coupled data 308 is held in the storage area K9 based on the value "9" of the second selection control signal 344, the pair {L29,L28} of the second coupled data 308 is held in the storage area K14 based on the value "14" of the second selection control signal 344, and the pair {L31,L30} of the second coupled data 308 is held in the storage area K15 based on the value "15" of the second selection control signal 344.

In the next period P5, as shown in FIGS. 5A and 5B, the channel demultiplexing circuit 120 operates as the bus master, and the second memory controller 113 operates as the bus slave. The channel demultiplexing circuit 120 transmits a write instruction for storing the channel-demultiplexed write data into the RAM 115 to the second memory controller 113. The second memory controller 113 stores the write data burst-transferred from the channel demultiplexing circuit 120 into the RAM 115 according to the write instruction.

In the period P5, the selective output circuit 345 of the channel demultiplexing circuit 120, as shown in FIG. 8, sequentially selects the input data signals to the terminals S16 to S31 based on the values "16" to "31" of the third selection control signals 346 and outputs the selected data signals to the data transfer control section 348 as write data 347. The data transfer control section 348 burst-transfers the write data 347 as data in a burst length of 16 to the second memory controller 113. After that, the same processing as the channel demultiplexing processing in the periods P3 to P5 is performed repetitively.

As described above, the channel demultiplexing processing according to the first embodiment can increase the speed of channel demultiplexing processing and improve the processing ability of the entire system since the latency occurring during the channel demultiplexing processing can be reduced more than the conventional technology by performing bus access more efficiently. In particular, the processing ability of the entire system including that of the semiconductor circuit 110 can be improved since the share of the internal bus 211 by channel demultiplexing processing can be reduced by the collective burst transfer of a channel data group.

Figure 9:
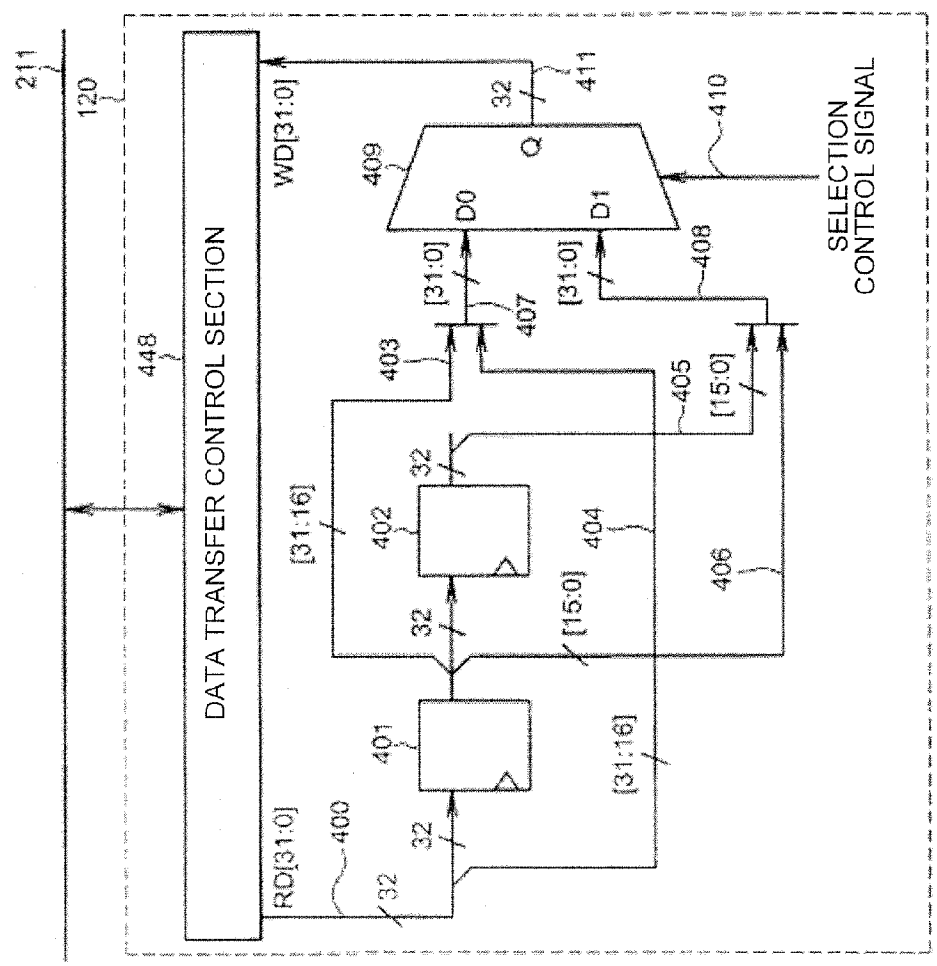
FIG. 9 is a diagram showing a schematic configuration of a channel demultiplexing circuit according to a second embodiment of the invention.

Next, a channel demultiplexing circuit according to a second embodiment of the present invention will be described. FIG. 9 is a diagram showing a schematic configuration of a channel demultiplexing circuit 120 according to the second embodiment. The channel demultiplexing circuit 120 in FIG. 9 has a data transfer control section 448 connected to the internal bus 211. The data transfer control section 448 receives stereo data (multi-channel data) 400 from 32 bit RD[31:0] transferred from the RAM 115.

A first delay circuit 401 holds the stereo data 400 of 32 bits, and a second delay circuit 402 holds a 32 bit output of the first delay circuit 401. The first delay circuit 401 and the second delay circuit 402 operate in synchronization with an operation clock CLK supplied from a clock generator (not shown) and delay an input signal by a time corresponding to a predetermined number of cycles of the operation clocks CLK. According to the second embodiment, the stereo data 400 has a format as shown in FIG. 2, like the first embodiment. Based on the format, the stereo data 400 has cyclic arrays of a pair of R-channel data (first channel data) Ri of the upper 16 bits and L-channel data (second channel data) Li of the lower 16 bits. Each of the first delay circuit 401 and the second delay circuit 402 has a function of delaying input data by one cycle corresponding to the bit length (=32 bits) of the channel data pair {Ri,Li}.

First coupled data 407 of 32 bits contains a couple of delayed R-channel data 403 of the higher 16 bits branched from a 32 bit output of the first delay circuit 401 and R-channel data 404 of the upper 16 bits branched from the stereo data 400. On the other hand, second coupled data 408 of 32 bits contains a couple of delayed L-channel data 405 of the lower 16 bits branched from a 32 bit output of the second delay circuit 402 and delayed L-channel data 406 of the lower 16 bits branched from a 32 bit output of the first delay circuit 401. The first coupled data 407 is input to a terminal D0 of a selective output circuit 409, and the second coupled data 408 is input to a terminal D1 of the selective output circuit 409.

The selective output circuit 409 selects input data to a terminal Di (where i is either 0 or 1) selected by the value of a selection control signal 410 of one bit from the processor 111 and supplies the selected input data to a data transfer control section 448 as write data 411 of 32 bit WD[31:0]. In other words, if the value of the selection control signal 410 is "0", the input data to the terminal D0 corresponding thereto is selected. If the value of the selection control signal 410 is "1", the input data to the terminal D1 corresponding thereto is selected. The data transfer control section 448 burst-transfers the write data 411 to the second memory controller 113 (FIG. 3) through the internal bus 211. The second memory controller 113 stores the R-channel data group and L-channel data group transferred from the channel demultiplexing circuit 120 into different storage area from each other in the RAM 115.

Figure 10:
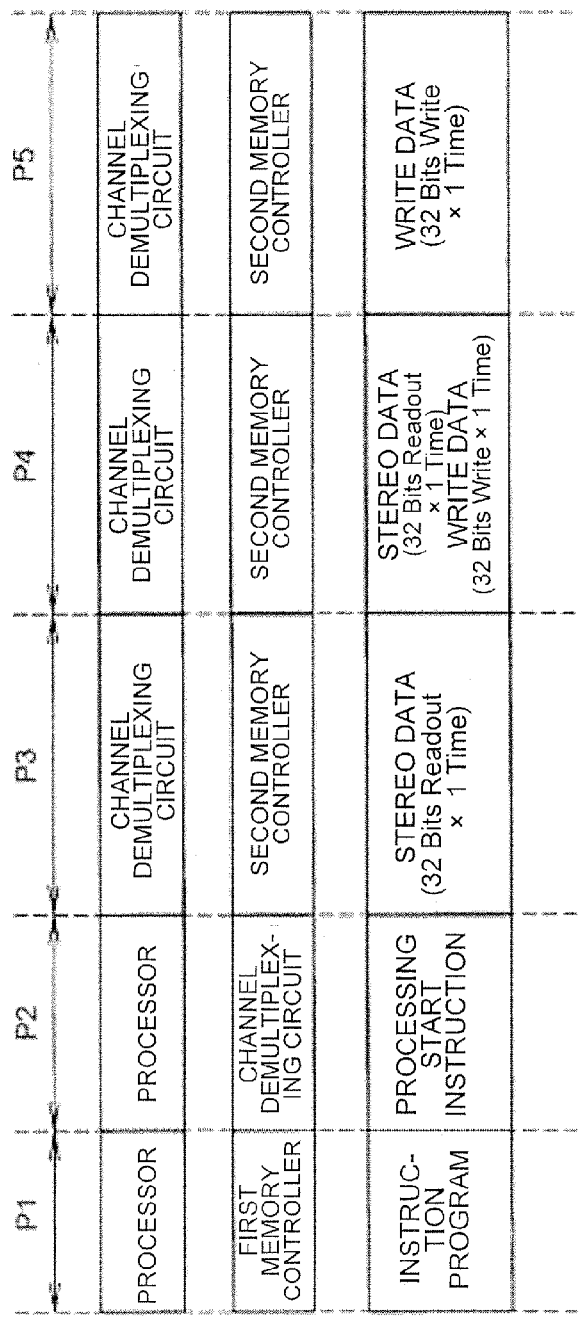
FIGS. 10A to 10C are timing charts schematically showing operational states of the channel demultiplexing circuit.
Figure 11:
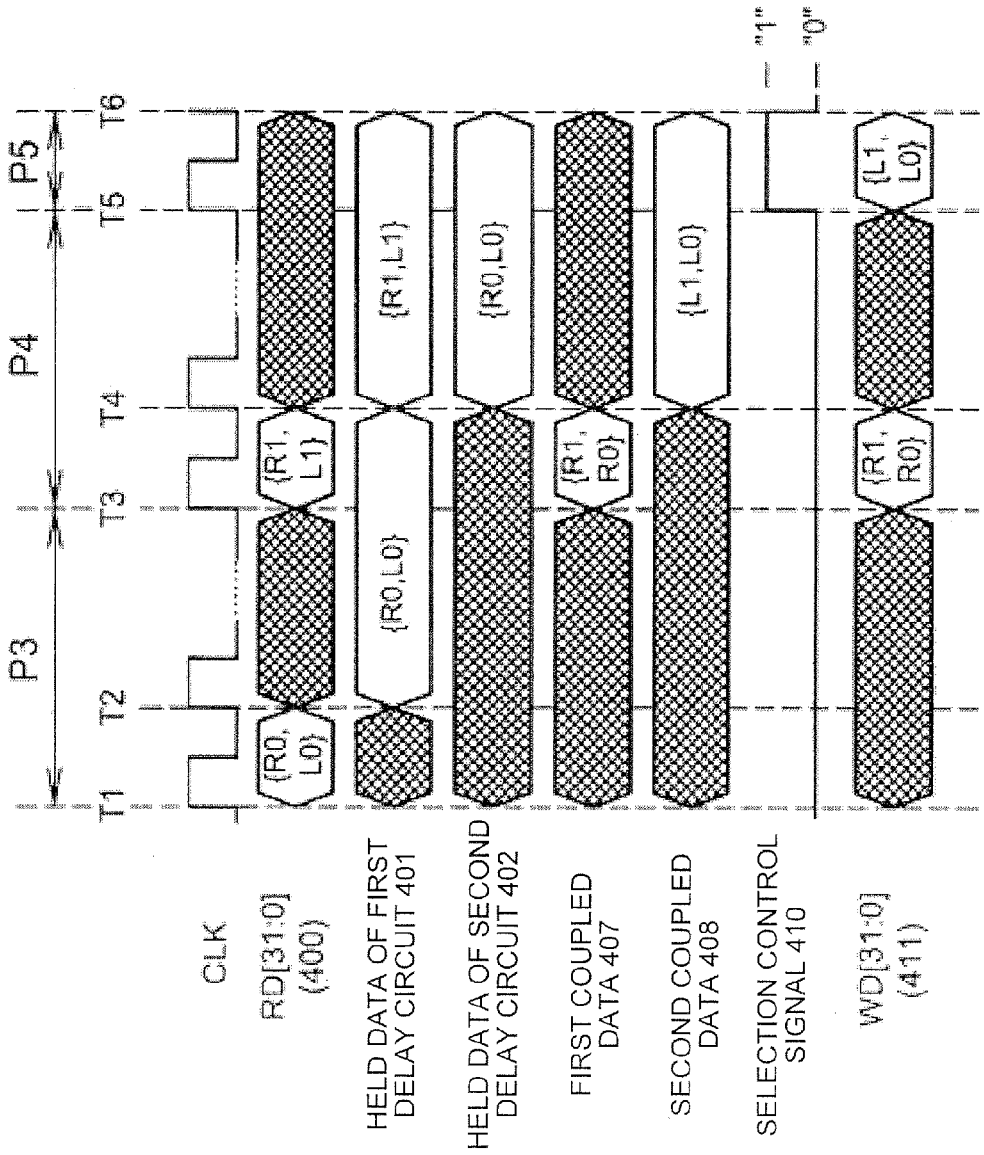
FIG. 11 is a timing chart showing states of data signals and control signals within the channel demultiplexing circuit.

With reference to FIGS. 10A to 11, operations by the channel demultiplexing circuit 120 according to the second embodiment will be described in detail below. FIGS. 10A to 10C are timing charts schematically showing operational states of the channel demultiplexing circuit 120. FIG. 11 is a timing chart showing the states of data signals and control signals within the channel demultiplexing circuit 120.

As shown in FIGS. 10A and 10B, in the first period P1, the processor 111 in FIG. 3 operates as the bus master, and the first memory controller 112 operates as the bus slave. In this case, as shown in FIG. 10C, the processor 111 transmits a read instruction for a channel demultiplexing program to the first memory controller 112. The first memory controller 112 reads the program from the ROM 114 outside of the semiconductor circuit 110 according to the read instruction and transfers the program to the channel demultiplexing circuit 120 through the internal bus 211. In the subsequent period P2, the processor 111 operates as the bus master and instructs to start channel demultiplexing processing to the channel demultiplexing circuit 120, which is the bus slave, according to the program loaded from the ROM 114.

In the next period P3, the channel demultiplexing circuit 120 operates as the bus master according to the instruction from the processor 111 and transmits a read instruction for stereo data 400 to the second memory controller 113, which is the bus slave. The second memory controller 113 sequentially reads the stereo data 400 in cycles according to the read instruction and burst-transfers the read stereo data 400 to the channel demultiplexing circuit 120 through the internal bus 211. The channel demultiplexing circuit 120 performs channel demultiplexing processing on the stereo data 400 received from the second memory controller 113.

In the period P3, the first pair {R0,L0} of the channel data is transferred to the data transfer control section 448 (FIG. 9) of the channel demultiplexing circuit 120. As shown in FIG. 11, the data transfer control section 448 supplies the channel data pair {R0,L0} as the stereo data 400 to the first delay circuit 301 during times T1 to T2. The second delay circuit 402 latches a 32 bit output of the first delay circuit 301.

In the next period P4, as shown in FIGS. 10A and 10B, the channel demultiplexing circuit 120 operates as the bus master, and the second memory controller 113 operates as the bus master. The channel demultiplexing circuit 120 transmits a read instruction for stereo data 400 and a write instruction for storing the channel-demultiplexed write data into the RAM 115 to the second memory controller 113. The second memory controller 113 sequentially reads out the stereo data 400 in cycles according to the read instruction and burst-transfers the read stereo data 400 to the channel demultiplexing circuit 120 through the internal bus 211. On the other hand, the second memory controller 113 stores the write data burst-transferred from the channel demultiplexing circuit 120 into the RAM 115 according to the write instruction.

In the period P4, the selective output circuit 409, as shown in FIG. 11, selects the pair {R1,L0} of the first coupled data 407 input to the terminal D0 based on the value "0" of the selection control signal 410 and supplies it to the data transfer control section 448 as write data 411. The data transfer control section 448 transfers the write data 411 of 32 bit WD[31:0] to the second memory controller 113. In parallel with that, the next pair of the channel data {R1,L1} is transferred to the data transfer control section 448 of the channel demultiplexing circuit 120. As shown in FIG. 11, the data transfer control section 448 during the times T3 to T4 supplies the channel data pair {R1,L1} to the first delay circuit 301 as the stereo data 400. The first delay circuit 301 latches and holds the channel data pair {R1,L1}. The second delay circuit 402 latches and holds the channel data pair {R0,L0}, which is a 32 bit output of the first delay circuit 301.

In the next period P5, as shown in FIGS. 10A and 10B, the channel demultiplexing circuit 120 operates as the bus master and transmits a write instruction to the second memory controller 113, which is the bus slave. The second memory controller 113 stores the write data transferred from the channel demultiplexing circuit 120 into the RAM 115 according to the write instruction. As shown in FIG. 11, the pair {L1,L0} of the second coupled data 408 input to the terminal D1 based on the value "1" of the selection control signal 410 is selected and is supplied to the data transfer control section 448 as write data 411. The data transfer control section 448 transfers the write data 411 to the second memory controller 113. After that, the same processing as the channel demultiplexing processing in the periods P3 to P5 is performed repetitively.

As described above, the channel demultiplexing processing according to the second embodiment can increase the speed of channel demultiplexing processing and improve the processing ability of the entire system since the latency occurring during the channel demultiplexing processing can be reduced more than the conventional technology by performing bus access more efficiently.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2007-145720 which is hereby incorporated by reference.

What is claimed is:

1. A data processing apparatus which performs demultiplexing of multi-channel data into a first channel data group and a second channel data group and outputs them into a bus, the apparatus comprising:

a channel demultiplexing circuit;
a memory which stores multi-channel data containing a pair of first channel data and second channel data for a predetermined cycle; and
a memory controller which sequentially reads out the multi-channel data from the memory for the predetermined cycle and transfers the read multi-channel data to the channel demultiplexing circuit through the bus,
wherein the channel demultiplexing circuit includes:
a first delay circuit which delays the first channel data only of the multi-channel data transferred from the memory controller for the predetermined cycle and outputs the first delayed channel data;
a second delay circuit which delays the second channel data only of the multi-channel data transferred from the memory controller by the predetermined cycle and outputs the second delayed channel data;
a channel data holding circuit which stores first coupled data obtained by coupling the first channel data and the first delayed channel data for the multiple predetermined cycles and stores second coupled data obtained by coupling the second channel data and output of the second delayed circuit for the multiple predetermined cycles; and
a selective output circuit which selectively reads out the first channel data group and the second channel data group from the channel data holding circuit to output to the bus.

2. The data processing apparatus according to claim 1, wherein the selective output circuit transfers the first channel data group and the second channel data group to the memory controller through the bus, and the memory controller stores the first channel data group and second channel data group transferred from the selective output circuit to different storage areas from each other in the memory.

3. The data processing apparatus according to claim 1, wherein the first channel data and the second channel data have an equal word length.

4. The data processing apparatus according to claim 1, wherein the channel demultiplexing circuit operates as a bus master for the bus while the memory controller operates as a bus slave when the multi-channel data is transferred and when the first channel data group and the second channel data group are output.

5. The data processing apparatus according to claim 4, wherein the channel demultiplexing circuit has a data transfer control section which performs burst-transfer to the memory controller.

6. The data processing apparatus according to claim 5, wherein the data transfer control section is a DMA controller (direct memory access controller).

7. The data processing apparatus according to claim 1, wherein the processor, the channel demultiplexing circuit, the memory controller and the bus are built in a single semiconductor integrated circuit.

8. A data processing apparatus which performs demultiplexing of multi-channel data into a first channel data group and a second channel data group and outputs them into a bus, the apparatus comprising:
a channel demultiplexing circuit;
a memory which stores multi-channel data containing a pair of first channel data and second channel data for each predetermined cycle; and
a memory controller which sequentially reads out the multi-channel data from the memory for the predetermined cycle and transfers the read multi-channel data to the channel demultiplexing circuit through the bus,
wherein the channel demultiplexing circuit has:
a first delay circuit which delays the multi-channel data transferred from the memory controller by the predetermined cycle and outputs first delayed multi-channel data;
a second delay circuit which delays the first delayed multi-channel data by the predetermined cycle and outputs second delayed multi-channel data; and
a selective output circuit which alternately selects first channel data group obtained by coupling first channel data of the multi-channel data and first channel data of the first delayed multi-channel data and second channel data group obtained by coupling second channel data of the first delayed multi-channel data and second channel data of the second delayed multi-channel data and outputs them to the bus.

9. The data processing apparatus according to claim 8, wherein the selective output circuit transfers the first channel data group and the second channel data group to the memory controller through the bus, and the memory controller stores the first channel data group and second channel data group transferred from the selective output circuit to different storage areas from each other in the memory.

10. The data processing apparatus according to claim 8, wherein the first channel data and the second channel data have an equal word length.

11. The data processing apparatus according to claim 8, wherein the channel demultiplexing circuit operates as a bus master for the bus while the memory controller operates as a bus slave when the multi-channel data is transferred and when the first channel data group and the second channel data group are output.

12. The data processing apparatus according to claim 8, wherein the processor, the channel demultiplexing circuit, the memory controller and the bus are built in a single semiconductor integrated circuit.

13. A data processing apparatus which performs demultiplexing of multi-channel data into a first channel data group and a second channel data group and outputs them into a bus, the apparatus comprising:
a channel demultiplexing circuit;
a memory which stores multi-channel data comprising channel data pairs each including first channel data and second channel data, the channel data pairs being sequentially arranged; and
a memory controller which sequentially reads out the channel data pairs from the memory to transfer read channel data pairs to the channel demultiplexing circuit through the bus,
wherein the channel demultiplexing circuit includes:
a first coupling circuit which couples two first channel data contiguously from two consecutive channel data pairs transferred from the memory controller to output a first coupled data;
a second coupling circuit which couples two second channel data contiguously from the two consecutive channel data pairs transferred from the memory controller to output a second coupled data;
a channel data holding circuit which sequentially stores a plurality of the first coupled data and sequentially stores a plurality of the second coupled data to form a first channel data group and a second channel data group, respectively; and
a selective output circuit which selectively reads out the first channel data group and the second channel data group from the channel data holding circuit for output to the bus.

14. The data processing apparatus according to claim 13, wherein the selective output circuit transfers the first channel data group and the second channel data group to the memory controller through the bus, and the memory controller stores the first channel data group and second channel data group transferred from the selective output circuit to different storage areas from each other in the memory.

15. The data processing apparatus according to claim 13, wherein the channel data pair is comprised of 2N bits, and the first channel data and the second channel data are higher order N bits and lower order N bits of the channel data pair.

16. The data processing apparatus according to claim 13, wherein the channel demultiplexing circuit operates as a bus master for the bus while the memory controller operates as a bus slave when the multi-channel data is transferred and when the first channel data group and the second channel data group are output.

17. The data processing apparatus according to claim 13, wherein the channel demultiplexing circuit has a data transfer control section which performs burst-transfer to the memory controller.

18. The data processing apparatus according to claim 17, wherein the data transfer control section is a DMA controller (direct memory access controller).

19. The data processing apparatus according to claim 13, wherein the processor, the channel demultiplexing circuit, the memory controller and the bus are built in a single semiconductor integrated circuit.

* * * * *